US012098713B2

(12) United States Patent
Huang

(10) Patent No.: US 12,098,713 B2
(45) Date of Patent: Sep. 24, 2024

(54) VACUUM PUMP

(71) Applicant: ZHEJIANG Z&Z INDUSTRIAL CO., LTD., Yuyao (CN)

(72) Inventor: Jianyi Huang, Yuyao (CN)

(73) Assignee: ZHEJIANG Z&Z INDUSTRIAL CO., LTD., Yuyao (CN)

( * ) Notice: Subject to any disclaimer, the term of this patent is extended or adjusted under 35 U.S.C. 154(b) by 164 days.

(21) Appl. No.: 17/349,529

(22) Filed: Jun. 16, 2021

(65) Prior Publication Data

US 2021/0310469 A1 Oct. 7, 2021

Related U.S. Application Data

(63) Continuation-in-part of application No. PCT/CN2020/078153, filed on Mar. 6, 2020.

(30) Foreign Application Priority Data

Aug. 12, 2019 (CN) ......................... 201910739479.3
Jun. 16, 2020 (CN) ......................... 202010546885.0
Jun. 16, 2020 (CN) ......................... 202010546887.X

(51) Int. Cl.
*F04B 37/14* (2006.01)
*B05B 11/10* (2023.01)
(Continued)

(52) U.S. Cl.
CPC .......... *F04B 37/14* (2013.01); *B05B 11/1069* (2023.01); *F04B 53/14* (2013.01);
(Continued)

(58) Field of Classification Search
CPC ........ F04B 37/14; F04B 53/14; F04B 53/162; F04B 13/02; F04B 19/06; B05B 11/1023;
(Continued)

(56) References Cited

U.S. PATENT DOCUMENTS 5,192,006 A * 3/1993 Van Brocklin ..... B05B 11/1066 222/321.9
5,803,318 A * 9/1998 Lina .................... B05B 11/1047 222/321.2
(Continued)

FOREIGN PATENT DOCUMENTS

CN 105035505 A * 11/2015 ............. A45D 34/02
CN 204916563 U * 12/2015
(Continued)

OTHER PUBLICATIONS

CN 105035505 A Original with English Translation (Year: 2015).*
(Continued)

*Primary Examiner* — Dominick L Plakkoottam
(74) *Attorney, Agent, or Firm* — Oliff PLC

(57) ABSTRACT

A vacuum pump including: a pump body that includes an elastic sleeve; a valve stem; a valve pin that is surrounded by the valve stem with an end of the valve pin snap fitted to the valve stem; a piston that surrounds the valve pin and that is located inside of the pump body and sealed against the pump body; a plug; a ring that surrounds the pump body and the plug; a head cap that surrounds the valve stem and that is configured to move within a cavity of the ring; and a spring disposed between the valve stem and the stepped groove of the plug at a position radially outward of the valve stem.

1 Claim, 10 Drawing Sheets

(51) Int. Cl.
*F04B 53/14* (2006.01)
*F04B 53/16* (2006.01)

(52) U.S. Cl.
CPC ......... *F04B 53/162* (2013.01); *B05B 11/1023* (2023.01); *B05B 11/1077* (2023.01)

(58) Field of Classification Search
CPC ............. B05B 11/1077; B05B 11/1047; B05B 11/1059; B05B 11/1069; B05B 11/1074; B05B 11/0032; B05B 11/1025; B05B 11/0044; B05B 11/1001; B05B 11/007
See application file for complete search history.

(56) References Cited

U.S. PATENT DOCUMENTS

| | | | | |
|---|---|---|---|---|
| 8,672,190 | B1 * | 3/2014 | Wang | B05B 11/106 222/321.9 |
| 10,512,926 | B2 * | 12/2019 | Goettke | B05B 11/1074 |
| 2011/0303702 | A1 * | 12/2011 | Wang | B05B 11/1074 222/336 |
| 2014/0138409 | A1 * | 5/2014 | Beranger | B65D 47/26 222/321.2 |
| 2015/0060484 | A1 * | 3/2015 | Byun | B05B 1/002 222/321.9 |
| 2015/0060493 | A1 * | 3/2015 | Duquet | A61L 2/10 222/148 |
| 2017/0036224 | A1 * | 2/2017 | Huang | A45D 34/02 |
| 2018/0093286 | A1 * | 4/2018 | Jourdin | B05B 11/1094 |
| 2018/0304291 | A1 * | 10/2018 | Knight | B05B 11/1047 |
| 2018/0346176 | A1 * | 12/2018 | Elmeguenni | B05B 11/1066 |
| 2019/0091710 | A1 * | 3/2019 | Knight | B05B 11/1074 |

FOREIGN PATENT DOCUMENTS

| | | | |
|---|---|---|---|
| CN | 107814078 | A | 3/2018 |
| CN | 109335269 | A | 2/2019 |
| CN | 110589208 | A | 12/2019 |

OTHER PUBLICATIONS

CN 204916563 U Original with translation (Year: 2015).*
Jun. 11, 2020 International Search Report issued in International Patent Application No. PCT/CN2020/078153.

* cited by examiner

VACUUM PUMP

TECHNICAL FIELD

The present invention relates to emulsion pump or vacuum pump, or specifically, a kind of vacuum pump.

BACKGROUND

Emulsion bottle and vacuum pump are a kind of containers for storage and taking of emulsion. Leveraging the principle of push-type micro-sized atomizer, they can eliminate the setup of wedge in the head cap, so that emulsion can flow out of the head cap of the nozzle through suction tube and pump body, without atomizing ejection due to blockage of wedge. Their differences depend on whether one side of the pump body is provided with a thru-hole and suction tube; the main structure of such emulsion bottle and vacuum pump is the emulsion bottle cap and pump cores, in which some pump cores are constructed in external spring for ease of use as common part and automatic production and assembly. However, the spring sealing in pump core of similar products available on the market depends on the structural design of large ring and head cap in particular application, it is difficult to independently seal the spring in pump core assembly, the unstable spring and externally provided spring in the pump core assembly make it susceptible to the impact of equipment during the automatic assembly and production of similar products, when used as a common part. And there are less similar products combined with plastic spring and nozzle as two structures, and it is difficult for similar products to be recycled by one-piece plastic structure.

SUMMARY OF INVENTION

To overcome the deficiencies as stated above, the present invention is intended to provide a vacuum pump or the vacuum pump for emulsion pump, to the extent that the difficulties of putting similar products in automatic assembly and production and the technical issues of carrying out one-piece plastic production, assembly and recycling would be resolved. These aims can be realized by the following technical solution.

A vacuum pump comprising a pump core assembly, the pump body of the pump core assembly is provided with an elastic sleeve, a valve pin, and a piston. The elastic sleeve is disposed in the slotted hole at the suction pipe end, the piston is nested in the nail outer diameter of the valve pin, the outer diameter of the piston is sealed against the inner walls of the pump body, the outer diameter of the nail ring groove at the nail end of the valve pin is snapped-fit to the buckle ring rib in the first valve stem, a spring is disposed in an area between the outer diameter of the first valve stem outwardly of the pump body and the first inner plug outwardly of the pump body, guide ribs are disposed on the inner walls of the inner ring of the piston; wherein the outer diameter of the first valve stem in the said pump body is nested into the inner diameter of the first inner plug, the inner diameter of the pump intake of the pump body is snapped-fit and sealed against the outer diameter of the lower plug of the first inner plug, the inner diameter of the upper plug of the first inner plug outwardly of the pump body is provided with a lower elastic cavity that is larger than the inner diameter of the plug, the inner diameter hole of the upper plug of the first inner plug is provided with the upper elastic cavity of the outer diameter of the first valve stem whose outer diameter is smaller than the inner diameter of the upper plug, the spring is disposed in the cavity formed by nesting the upper spring cavity of the first valve stem into the lower spring cavity of the first inner plug, which means that the outer diameter of the upper spring cavity at the stem rim of the first valve stem is upper ring, the upper ring of the first valve stem is nested into the inner diameter of the upper plug of the first inner plug. The said spring is a metal spring, so that the spring is securely arranged in the spring cavity formed by the outer diameter of the first valve stem and the outer diameter of the first inner plug. The said vacuum pump is intended as a common part after production and assembly, which means that it can be mounted in the vacuum pump, emulsion pump and other products through automatic production. In the production and assembly of the said vacuum pump, the spring as a part of the vacuum pump is not susceptible to the interference by equipment or other objects.

An upper stepped groove is disposed in the bottom part of the inner diameter of the upper ring of the said first valve stem, a lower stepped groove is disposed in the inner diameter of the first inner plug at the pump intake of the pump body, one end of the spring is fit and secured to the lower stepped groove of the first inner plug, and vertical grooves are uniformly distributed in the outer diameter of the first valve stem at the spring. The said structure facilitates two ends of the spring to be secured onto the first valve stem and the first inner plug respectively, and makes sure that the spring is used smoothly in the outer diameter of the first valve stem, especially the conduction and stability of pressure within the spring cavity.

An inner ring of the piston is provided underneath the buckle ring rib of the said first valve stem, the tip of the inner ring of the piston is provided with an inner ring rim of the piston extended out of the ring rim of the piston, the inner ring of the piston of the first valve stem is nested hermetically with the inner ring rim of the piston, the ring rim in the bottom of the inner ring of the piston is sealed fit to the nailhead ring groove of the valve pin, a conical bottom cavity is disposed in the bottom part of the valve pin. When pressing the first valve pin, the bevel ring of the outer diameter of the bottom cavity hole of the valve pin is set against and limited to the inner walls of the pump body above the elastic sleeve. Thereby, the piston is further sealed to the first valve stem through the inner ring rim of the piston, and sealed protectively to the valve pin when returning and pressing, the stroke of the valve pin is limited onto the inner walls above the elastic sleeve of the pump body, and formed a buffer cavity with the elastic sleeve through the bottom cavity in the bottom part of the valve pin, so that the pressure within the pump body would be stabilized when pressing.

A Z-shaped curved adjoining rib and a hallow hole are disposed in an area between the cartridge of the said elastic sleeve and the center piece at one side of the sleeve opening, the center piece of the elastic sleeve is set against the center conical hole of the pump body, the center conical hole of the pump body is the inlet hole of the pump body, a stepped ring diameter is provided above the center conical hole of the pump body, and the other side of the sleeve opening of the cartridge is limited to the stepped ring diameter of the pump body. The available general pump core elastic sleeves are poorly sealed when equipped with a piston, the elastic sleeve and pump body as a part of the vacuum pump are constructed in plane-plane sealing structure, which is not easy to seal and there is less sealing faces, uneven or slanted plane may disable the sealing performance. When pressing and returning, the adjoining ribs through the elastic sleeve are slightly deformed, so that the elastic sleeve can open for liquid entry, or close for sealing.

The pump body groove ring and the raised ring of the first inner plug are disposed on the area where the outer diameter of the pump intake of the said pump body is fit to the first inner plug respectively; the pump body groove ring of the said pump body and the raised ring of the first inner plug are interference-fit and secured to the fixing ring groove of the inner diameter of the upper ring of the large ring. The said structure would facilitate the assembly and fixing of the vacuum pump in similar products. The vacuum pump is secured to the actual embodiment of the large ring in similar products through the concave ring of the pump body and the convex ring of the first inner plug.

The bottom part of the inner ring of the lower ring of the said large ring is provided with large ring threaded groove and the lower inner ring groove of the large ring, the lower outer ring groove of the large ring is disposed in the outer diameter of the large ring threaded groove in the large ring, the lower outer ring groove of the large ring is connected to the ribbed groove of the large ring underneath, the inner diameter of the ribbed groove of the large ring is larger than that of the lower outer ring groove of the large ring, there is a clearance between the inner diameter of the lower outer ring groove of the large ring underneath the fixing ring groove of the large ring lower ring and the outer diameter of the pump body, raised ribs are disposed on the inner walls of the large ring ribbed groove, a top groove is disposed in the outer diameter of the fixing ring groove on the tip of the large ring, the inner ring of the first head cap is snapped-fit to the inner diameter of the stem rim of the first valve stem, the outer ring of the first head cap is nested to the inner diameter of the top groove of the large ring. The diameter of the lower ring outer diameter of the large ring, the diameter of the upper ring outer diameter of the large ring, and that of the outer diameter of the first head cap decrease in descending order. The embodiment as described above is the specific structure of the vacuum pump and the emulsion pump, wherein the said structure of the large ring is prepared by one-piece injection molding.

The said first valve stem is substituted by the second valve stem, the tip of the second valve stem is provided with an outwardly flipped groove that curves downwardly, the outer diameter of the stem part of the second valve stem is disposed with intake grooves that are uniformly distributed, one end of the first plastic spring is set against the outwardly flipped groove of the second valve stem, the other end of the first plastic spring is set against the outer ring edge plane of the second inner plug and the end face of the center hole of the large ring, one end of the first plastic spring is provided with an upper sleeve opening, one end of the first plastic spring is provided with a lower sleeve opening, a “W-shaped” cylinder is disposed in an area between the upper sleeve opening and the lower sleeve opening of the first plastic spring, the upper sleeve opening, the lower sleeve opening and the “W-shaped” cylinder of the first plastic spring are formed as one-piece, the first plastic spring is located in the outer diameter of the second valve stem, and the first plastic spring is joined to the pump core assembly. Thereby, the first plastic spring formed from one-piece molding process allows for recycling of the entire emulsion nozzle. In other words, the said emulsion nozzle can readily enables the first plastic spring to be manufactured and assembled by only modifying the second valve stem structure of similar products now available in the market, and the fixing structure of the first plastic spring provided in an area between the large spring and the second valve stem is secured.

The outer diameter of the lower sleeve opening of the said first plastic spring is provided with ribs that are uniformly distributed, and the ribs on the first plastic spring are nested with the inner wall groove on the inner walls of the center hole of the large hole. The said structure further secure the first plastic spring, so that it may not be easily offset from the center whenever used.

The said pump body of the said pump core assembly is snapped-fit and secured to the center hole of the large ring through the second inner plug. While the inner concave ring rib of the pump intake of the pump body is unevenly snapped-fit to the outer convex ring rib of the second inner plug, the raised outer ring edge of the outer diameter of the second inner plug is fit to the pump intake of the pump body, the nailhead at one end of the valve pin in the pump body is snapped-fit to the inner rib hole of the second valve stem, a piston is disposed in the outer diameter of the valve pin at the snap-fit point, a liquid distributing channel is disposed on the inner walls of the inner rib hole of the second valve stem, the second valve stem is nested to the second inner plug, the outer diameter of the piston is slipped-fit and sealed against the inner walls of the pump body, a bottom slotted hole is disposed in the bottom part of the second valve pin that nested into the valve pin, the outwardly flipped rim of the piston is slipped-fit and sealed against the inner walls of the bottom slotted hole of the second valve stem, the bottom slotted hole of the second valve stem appears like an arc bottle rim, which means that the bottom slotted hole in the liquid distributing channel of the second valve stem is a semicircular hole, the bottom slotted hole underneath the semicircular hole is a cylindrical hole, and an elastic sleeve is disposed at the inlet hole in the pump body. The pump core assembly structure within respect to another specific structure is described above, which is acquired from the modification of the inner plug and the valve stem structure.

The said ring rim in the bottom part of the first head cap is located in an area above the ring groove of the outer diameter of the center hole of the large ring, a ring catch groove is disposed in the outer diameter of the center hole underneath the large ring, a buffer groove is disposed in the large ring of the outer diameter of the ring groove, convex ribs are provided in the large ring underneath the buffer groove, and the end of ribs flushes with the outer ring rim of the buffer groove. The above design facilities the stroke stability and dustproof feature of the first head cap, and the snap-fitting and fixing of the large ring and the rim ring diameter of the inner bottle through the ring catch groove, and the large ring is set against the outer bottle rim by ribs for collision buffering. In other words, the said structure is intended for snap-fitting and securing of the double-layer bottle structure in the inner bottle.

A spacer plug is disposed in an area between the outer diameter of the pump body underneath the center hole of the said large ring and the ring catch groove, the height of the ring rim of the spacer plug is below that of the ring catch groove, and a spacer ring is disposed in an area between the outer diameter of the pump body and the inner diameter of the spacer plug. The said structure facilitates further sealing between the inner diameter of the inner bottle rim in the double-layer bottle structure and the spacer plug.

An open groove is disposed on one side of the inner diameter of the ring rim of the ring groove of the large ring. The open groove of the said large ring is nested into the stop ribs on one side of the rim ring diameter of the inner bottle, so that the inner bottle is more securely adjoined to the large ring.

The second inner plug is an outwardly flipped inner plug, the outer diameter of the pump intake of the pump body is snapped-fit and secured on the lower inner groove of the outwardly flipped inner plug, and the outer diameter of the lower inner groove of the outwardly flipped inner plug is snapped-fit and secured on the center hole of the large ring. The structural embodiment of the second inner plug facilitates the snap-fitting and securing of the inner plug structure and the center hole of the large ring.

The said large ring is substituted by an inner ring, an outer guard and a rotating ring, the rotating ring of the said outer guard is provided with a spiral slotted hole, column pins are symmetrically disposed on the outer diameter of the middle ring of the inner ring, the column pins of the inner ring are inserted into the guard locating slot of the inner walls of the outer guard, an inner ring slot is disposed in the middle above the middle ring of the inner ring, open ring locating slots are symmetrically disposed at the ring ribs on both sides of the inner ring slot of the inner ring, the pump core assembly is snapped-fit and secured to the center hole of the inner ring, a washer is disposed on the outer ring of the pump core assembly beneath the area where it is snapped-fit and secured, the first valve stem of the valve core assembly extends out of the inner ring and is joined to the second head cap, a spring is disposed on the outer ring of the first valve stem of the valve core assembly; the said spring is the second plastic spring with an outer sleeve opening disposed on one end and an inner sleeve opening disposed on the other end, a "W-shaped" cylinder is arranged between the outer sleeve opening and the inner sleeve opening of the second d plastic spring. The outer sleeve opening, the inner sleeve opening and the "W-shaped" cylinder are formed in one-piece on the second plastic spring. Both ends of the second plastic spring are set against the second head cap and the inner ring. In other words, the outer diameter of the outer sleeve opening of the second plastic spring is nested in the rib groove in the bottom part inside the second head cap, the ring rim of the inner sleeve opening of the second plastic spring is set against the ring groove in the bottom part of the inner ring groove of the inner ring, and the second plastic spring is disposed inwardly of the inner ring groove of the inner ring. Thereby, the entire vacuum pump can be recycled by the second plastic spring that is formed as one-piece. In other words, the said vacuum pump can readily enables the first metal spring to be replaced by the second plastic spring and manufactured and assembled by only modifying the spring structure in the outer guard of the first valve stem of similar products now available in the market, and the fixing structure of the second plastic spring provided in an area between the second head cap and the inner ring is secured.

The rib groove of the said second head cap is disposed on the rib plates of the bottom inside the second head cap. The rib plates are arranged symmetrically in a cross shape, the inner walls of the rib grooves on both sides of the outlet hole are symmetrically provided with guide ribs, the guide ribs of the second head cap are inserted into the ring locating slot of the inner ring; the ring rim of the outer diameter in the bottom part of the second head cap is disposed above the guide groove of the inner ring, the guide slot is disposed outwardly of the inner ring groove of the inner ring, and the inner groove notch of the inner ring is located inwardly of the ring rim of the outer diameter in the bottom part of the second head cap. The said structure further improves the guided movement of the second head cap and the dustproof effect in the inner ring.

The said spring is disposed in the area between the small tight ring of the said first valve stem and the large tight ring of the lock fitting. The said spring may use an auxiliary second plastic spring or a metal spring, in which the auxiliary second plastic spring is an available spiral spring or any other available plastic spring structure.

A small ring groove is disposed in the middle underneath the middle ring of the said inner ring, an inner thread is provided in the small ring groove, the ring rim of the small ring groove is disposed at a height lower than the ring rim of the rotating ring, the hole on one side of the elastic sleeve of the pump body is disposed in the ring rim of the rotating ring, a fastening ring is disposed in the inner diameter of the ring rim of the rotating ring, the diameter of the fastening ring of the rotating ring is smaller than the inner diameter of the rotating ring above it, a limiting step ring is disposed in the fastening ring of the rotating ring and its one end is provided with convex ribs that are symmetrically arranged. The said structure facilitates the structural adjoining of the inner ring and the rotating ring to the inner and outer bottles. In other words, the outer bottle rim is snap-fit and secured to the rotating ring rim, the rim spiral rim of the inner bottle and the inner thread of the inner ring.

The outer diameter of the inner ring and the outer diameter of the rotating ring are formed in a cylindrical shape as one-piece, a raised nozzle is disposed on one side of the second head cap and the nozzle is recessed in the nozzle groove disposed on one side of the tip of the outer guard. The said structure facilitates the formation of cylindrical integral structure by the inner ring, the rotating ring and the bottle.

The structure of the present invention is reasonably designed, user-friendly and easily assembled, all components are mounted tightly and firmly, with good sealing and stable properties, the spring is stable and well-isolated, and the one-piece plastic structure can be recycled easily; it can suitably function as a vacuum pump or one-piece plastic vacuum pump externally provided on the spring, or as one-piece plastic emulsion pump, and as structural modification of its similar products.

Figure 1:
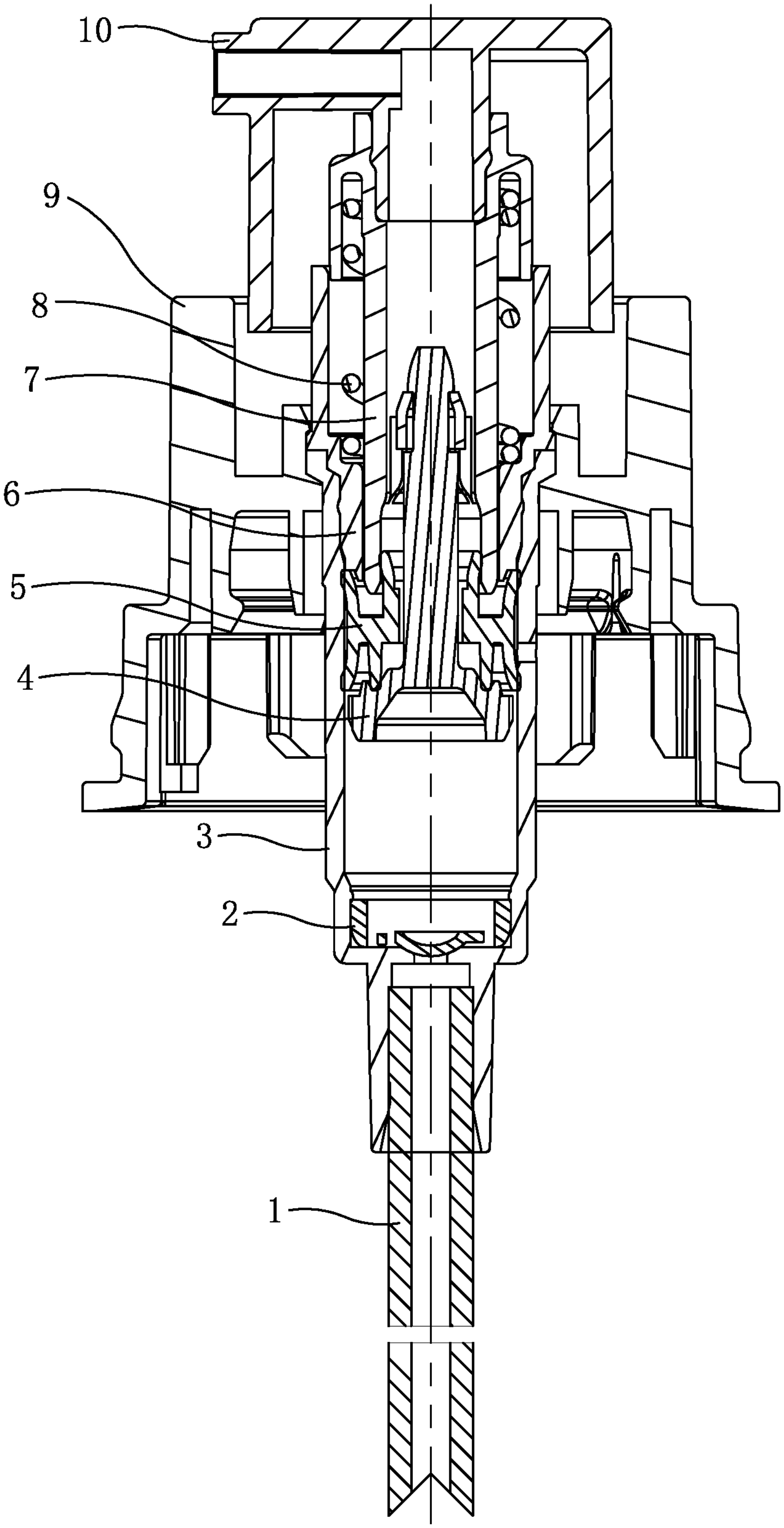
FIG. 1 is a schematic cross-sectional view of the first embodiment of the present invention at initial state.

Serial number and name of the drawings: 1. Suction tube, 2. Elastic sleeve, 201. Center piece, 202. Sleeve, 3. Pump body, 301. Center conical hole, 302. Stepped ring diameter, 4. Valve pin, 5. Piston, 501. Inner ring rim of the piston, 6. First inner plug, 601. Lower plug, 602. Lower stepped groove, 603. Upper plug, 7. First valve stem, 701. Vertical groove, 702. Upper ring, 703. Inner ring of the piston, 8. Spring, 9. Large ring, 10. First head cap, 11. First plastic spring, 12. Second valve stem, 13. Second inner plug, 14. Second head cap, 15. Second plastic spring, 16. Inner ring, 17. Outer guard, 18. Rotating ring.

EMBODIMENTS

The structure of the present invention will be further described by referring to the accompanying drawings. Referring to Embodiment 1 as shown in FIGS. 1-FIG. 6, the said vacuum pump comprises a pump core assembly, the pump body 3 of the pump core assembly is provided with an elastic sleeve 2, a valve pin 4, and a piston 5. The elastic sleeve is disposed in the slotted hole at the suction pipe end, the piston is nested in the nail outer diameter of the valve pin, the outer diameter of the piston is sealed against the inner walls of the pump body, the outer diameter of the nail ring groove at the nail end of the valve pin is snapped-fit to the buckle ring rib in the first valve stem 7, a spring 8 is disposed in an area between the outer diameter of the first valve stem 6 outwardly of the pump body and the first inner plug outwardly of the pump body, guide ribs are disposed on the inner walls of the inner ring of the piston. Its specific structure is described below: the outer diameter of the first valve stem in the said pump body is nested into the inner diameter of the first inner plug, the inner diameter of the pump intake of the pump body is snapped-fit and sealed against the outer diameter of the lower plug 601 of the first inner plug, the inner diameter of the upper plug 603 of the first inner plug outwardly of the pump body is provided with a lower elastic cavity that is larger than the inner diameter of the plug, the inner diameter hole of the upper plug of the first inner plug is provided with the upper elastic cavity of the outer diameter of the first valve stem whose outer diameter is smaller than the inner diameter of the upper plug, the spring is disposed in the cavity formed by nesting the upper spring cavity of the first valve stem into the lower spring cavity of the first inner plug, which means that the outer diameter of the upper spring cavity at the stem rim of the first valve stem is upper ring 702, the upper ring of the first valve stem is nested into the inner diameter of the upper plug of the first inner plug. An upper stepped groove is disposed in the bottom part of the inner diameter of the upper ring of the said first valve stem, a lower stepped groove 602 is disposed in the inner diameter of the first inner plug at the pump intake of the pump body, one end of the spring is fit and secured to the lower stepped groove of the first inner plug, and vertical grooves 701 are uniformly distributed in the outer diameter of the first valve stem at the spring.

The pump body groove ring and the raised ring of the first inner plug are disposed on the area where the outer diameter of the pump intake of the said pump body is fit to the first inner plug respectively, an inner ring of the piston 703 is provided underneath the buckle ring rib of the said first valve stem, the tip of the inner ring of the piston is provided with an inner ring rim of the piston 501 extended out of the ring rim of the piston, the inner ring of the piston of the first valve stem is nested hermetically with the inner ring rim of the piston, the ring rim in the bottom of the inner ring of the piston is sealed fit to the nailhead ring groove of the valve pin, a conical bottom cavity is disposed in the bottom part of the valve pin. When pressing the first valve pin, the bevel ring of the outer diameter of the bottom cavity hole of the valve pin is set against and limited to the inner walls of the pump body above the elastic sleeve. A Z-shaped curved adjoining rib and a hallow hole are disposed in an area between the cartridge 202 of the said elastic sleeve and the center piece 201 at one side of the sleeve opening, the center piece of the elastic sleeve is set against the center conical hole 301 of the pump body, the center conical hole of the pump body is the inlet hole of the pump body, a stepped ring diameter 302 is provided above the center conical hole of the pump body.

Figure 2:
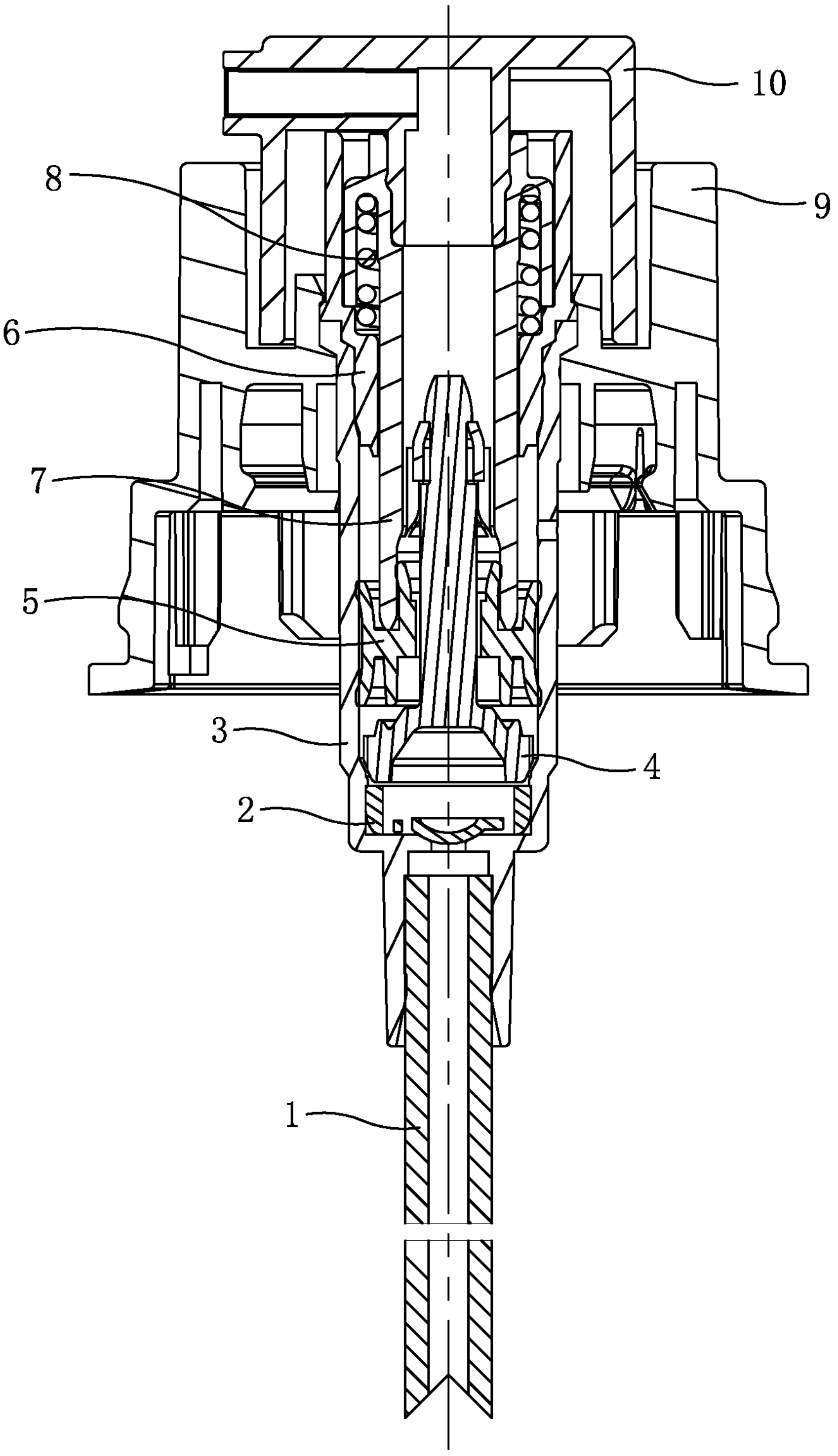
FIG. 2 is schematic cross-sectional view of the structure of FIG. 1 when pressing.
Figure 3:
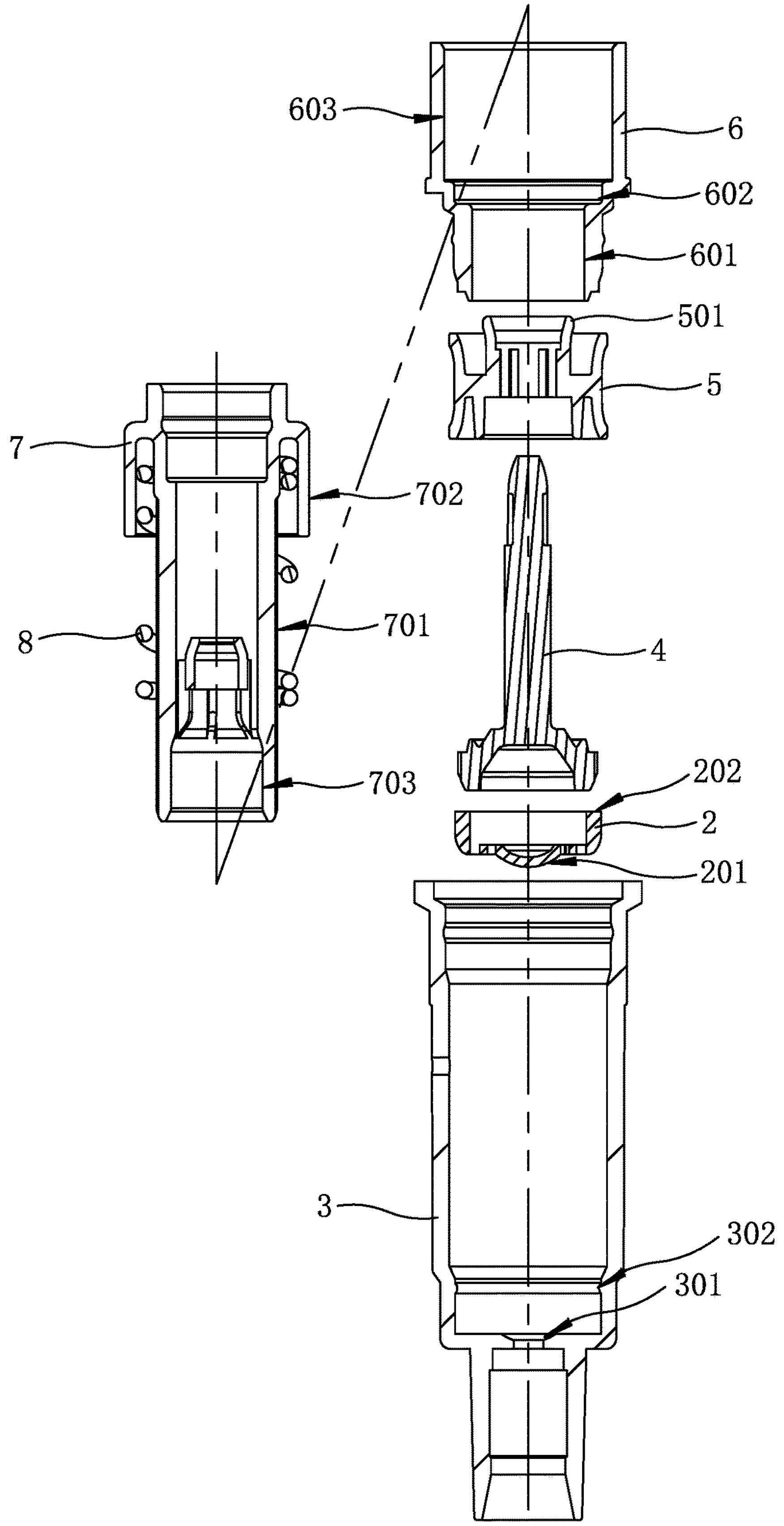
FIG. 3 is a schematic cross-sectional view of the pump core assembly in the first embodiment of the present invention at the exploded state

Referring to the embodiment of the vacuum pump application as shown in FIGS. 1 and 2, the pump body groove ring of the said pump body and the raised ring of the first inner plug are interference-fit and secured to the fixing ring groove of the inner diameter of the upper ring of the large ring 9, the bottom part of the inner ring of the lower ring of the said large ring is provided with large ring threaded groove and the lower inner ring groove of the large ring, the lower outer ring groove of the large ring is disposed in the outer diameter of the large ring threaded groove in the large ring, the lower outer ring groove of the large ring is connected to the ribbed groove of the large ring underneath, the inner diameter of the ribbed groove of the large ring is larger than that of the lower outer ring groove of the large ring, there is a clearance between the inner diameter of the lower outer ring groove of the large ring underneath the fixing ring groove of the large ring lower ring and the outer diameter of the pump body, raised ribs are disposed on the inner walls of the large ring ribbed groove, a top groove is disposed in the outer diameter of the fixing ring groove on the tip of the large ring, the inner ring of the first head cap is snapped-fit to the inner diameter of the stem rim of the first valve stem, the outer ring of the first head cap is nested to the inner diameter of the top groove of the large ring. The diameter of the lower ring outer diameter of the large ring, the diameter of the upper ring outer diameter of the large ring, and that of the outer diameter of the first head cap decrease in descending order.

Figure 4:
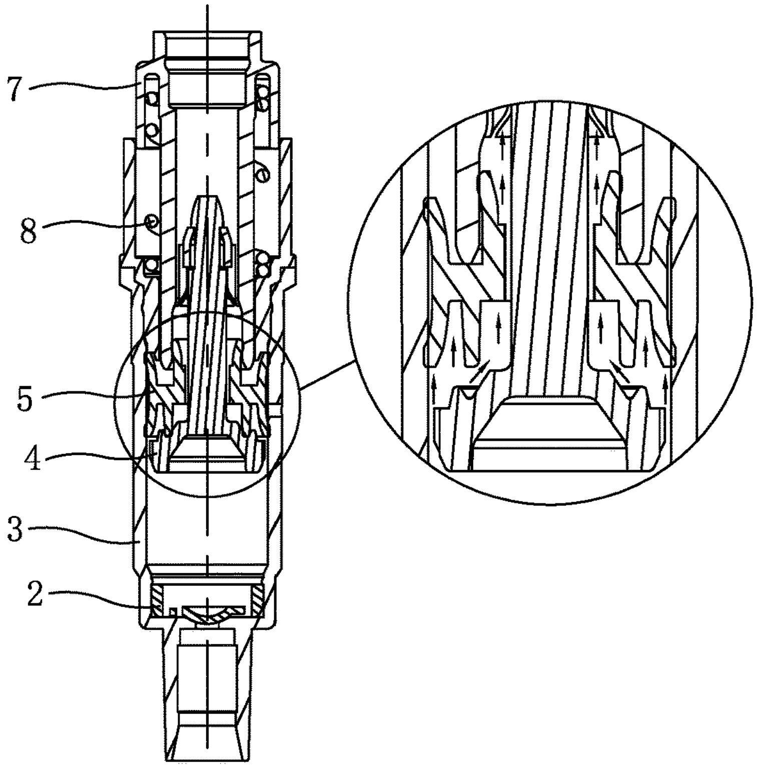
FIG. 4 is a schematic cross-sectional view of the composite state of FIG. 3, where the framed part as shown in the figure is enlarged and the arrow indicates the liquid flow direction.
Figure 5:
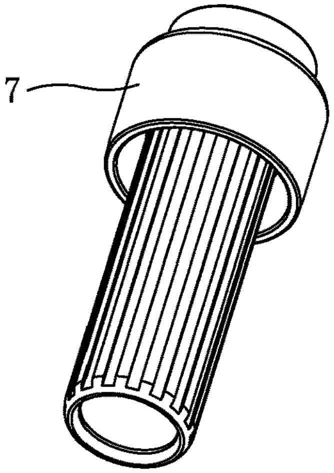
FIG. 5 is a schematic diagram of the three-dimensional structure of the first valve stem in the first embodiment of the present invention.
Figure 6:
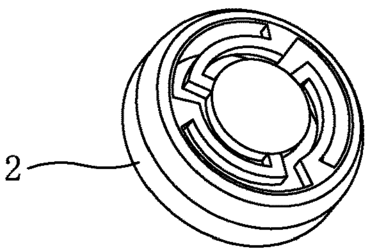
FIG. 6 is a schematic diagram of the three-dimensional structure of the elastic sleeve in the first embodiment of the present invention.
Figure 7:
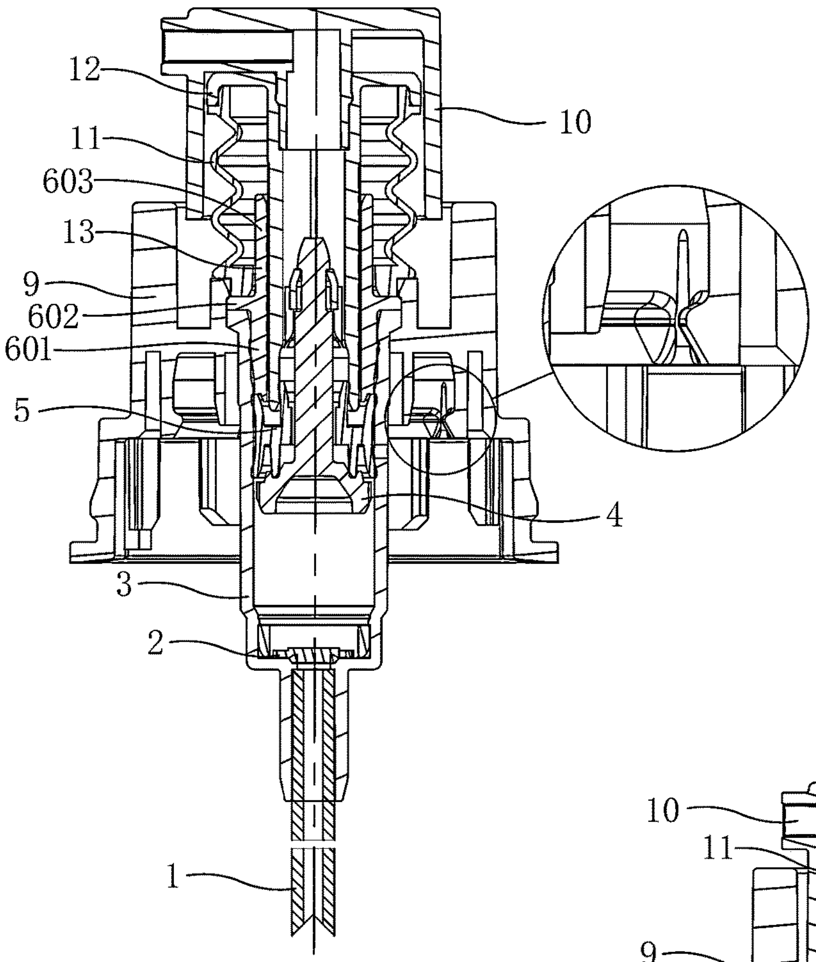
FIG. 7 is a schematic cross-sectional view of the second embodiment of the present invention.
Figure 8:
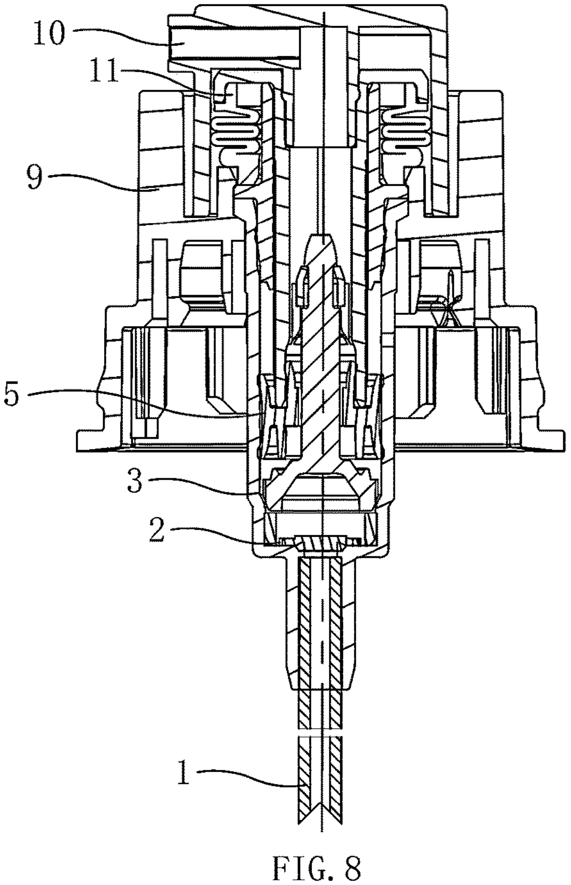
FIG. 8 is schematic cross-sectional view of the first head cap of FIG. 7 when pressed.
Figure 9:
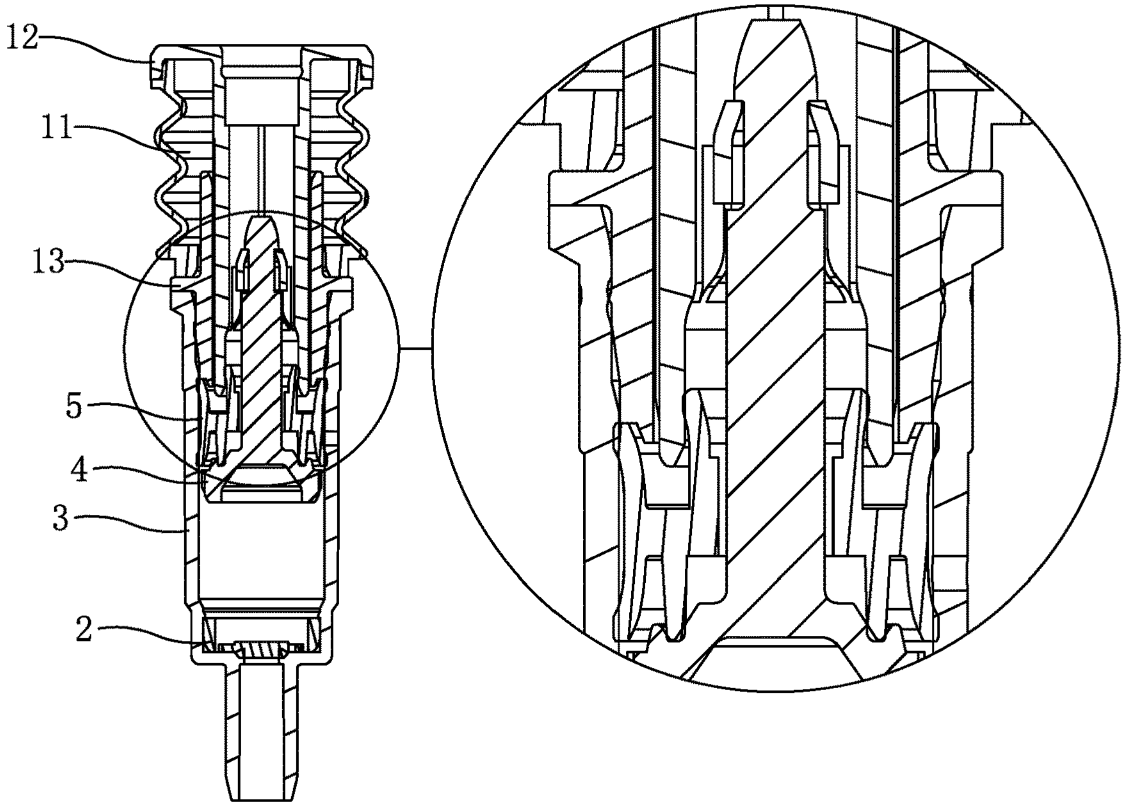
FIG. 9 is a schematic vertical sectional view of the pump core assembly in the second embodiment of the present invention, where the framed part as shown in the figure is enlarged.
Figure 10:
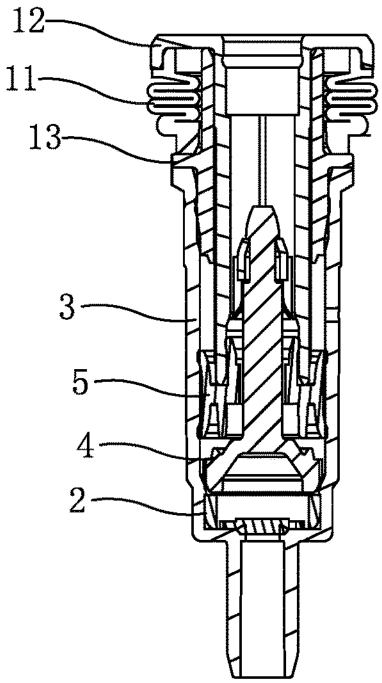
FIG. 10 is a schematic cross-sectional view of the structure of FIG. 9 when pressed.
Figure 11:
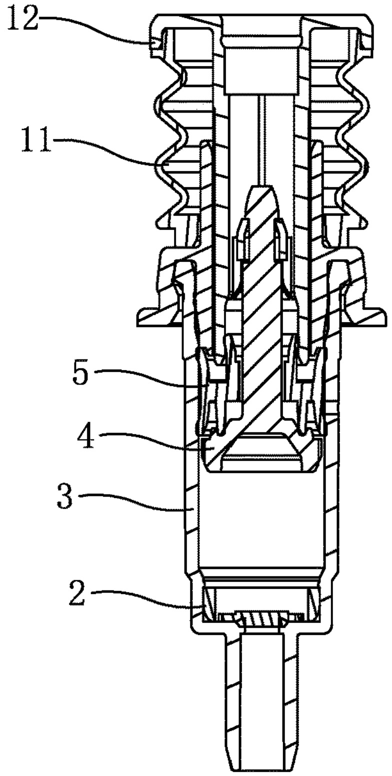
FIG. 11 is a schematic cross-sectional view of the modified structure of FIG. 9.
Figure 12:
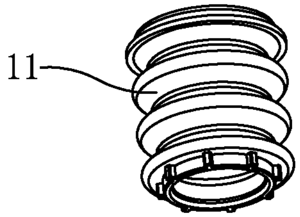
FIG. 12 is a schematic diagram of the three-dimensional structure of the plastic spring in the second embodiment of the present invention.
Figure 13:
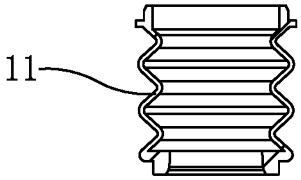
FIG. 13 is a schematic cross-sectional view of the structure of FIG. 12.
Figure 14:
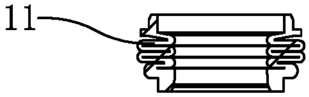
FIG. 14 is a schematic cross-sectional view of the structure of FIG. 13 when pressed.
Figure 15:
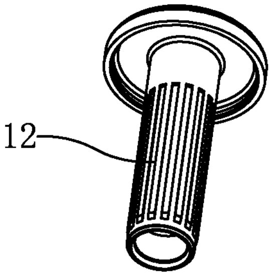
FIG. 15 is a schematic diagram of the three-dimensional structure of the second valve stem in the second embodiment of the present invention.
Figure 16:
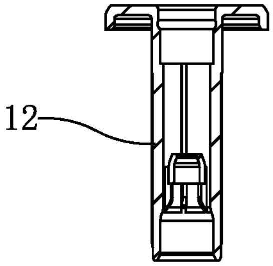
FIG. 16 is a schematic cross-sectional view of the structure of FIG. 15.
Figure 17:
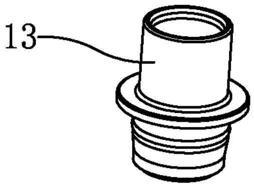
FIG. 17 is a schematic diagram of the three-dimensional structure of the second inner plug in the second embodiment of the present invention.
Figure 18:
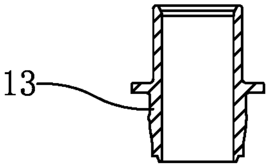
FIG. 18 is a schematic sectional view of the structure of FIG. 17.
Figure 19:
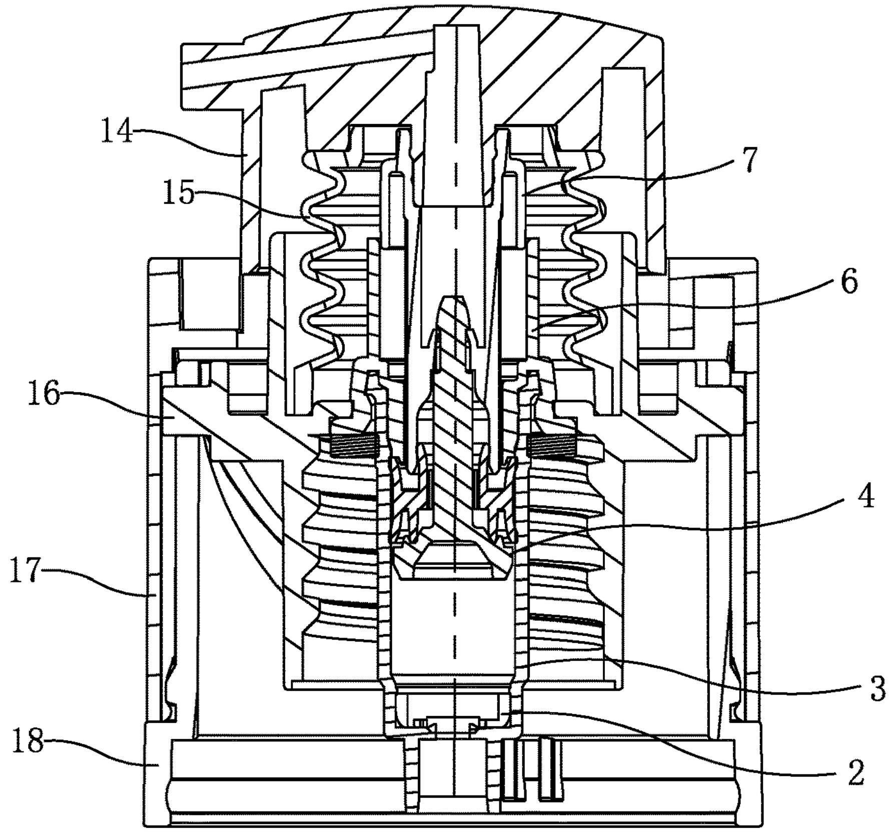
FIG. 19 is a schematic cross-sectional view of the third embodiment of the present invention.
Figure 20:
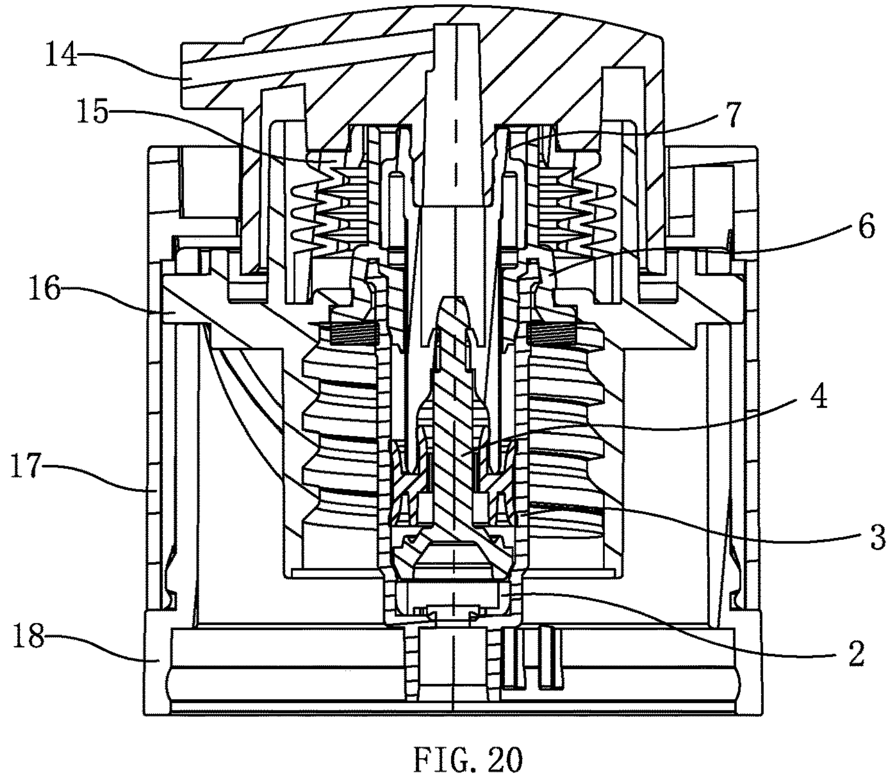
FIG. 20 is a schematic cross-sectional view of the second head cap of FIG. 19 when pressed.
Figure 21:
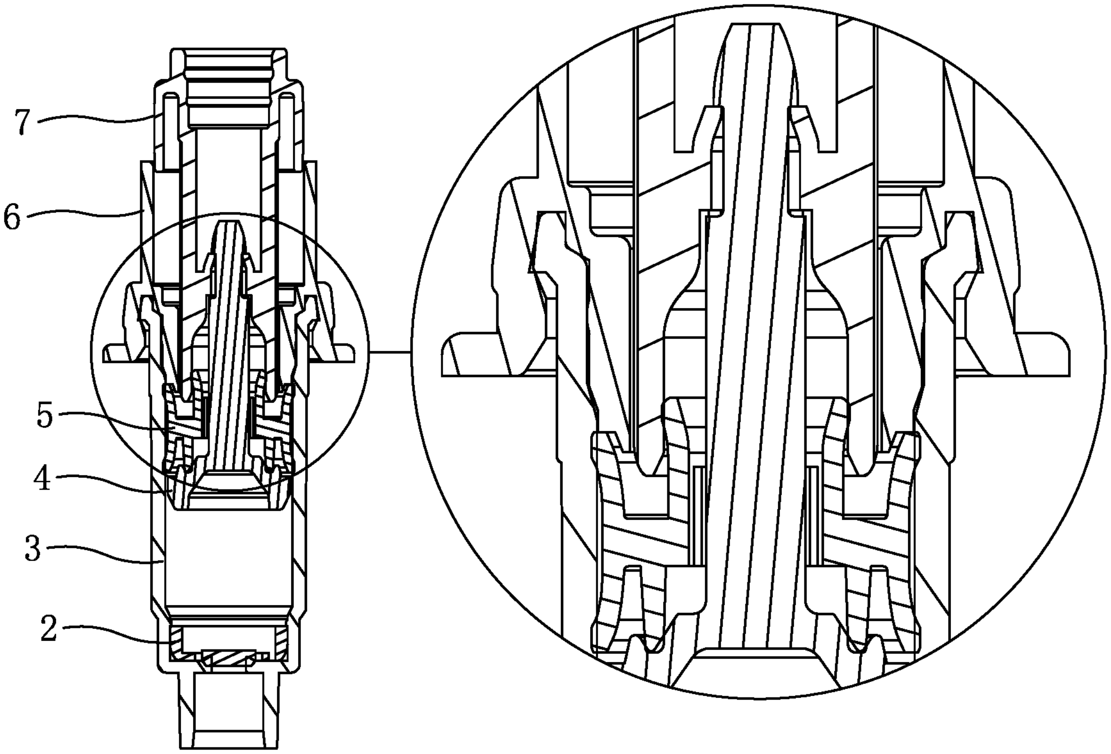
FIG. 21 is a schematic diagram of the vertical sectional view of the pump core assembly in the third embodiment of the present invention, where the framed part as shown in the figure is enlarged.
Figure 22:
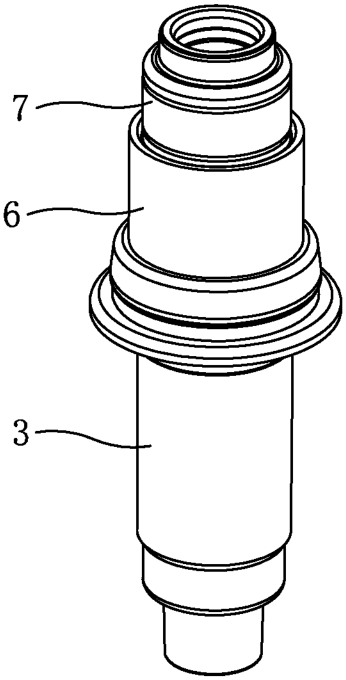
FIG. 22 is a schematic diagram of the three-dimensional structure of FIG. 21.
Figure 23:
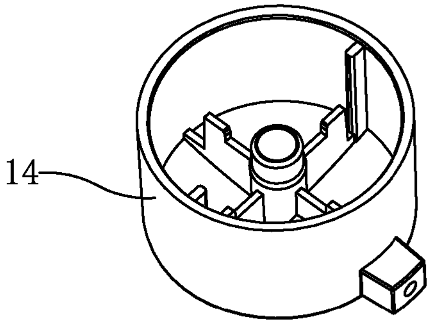
FIG. 23 is a schematic diagram of the bottom structure of the second head cap in the third embodiment of the present invention.
Figure 24:
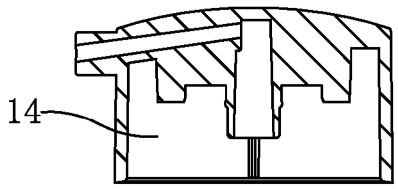
FIG. 24 is a schematic cross-sectional view of the structure of FIG. 23.
Figure 25:
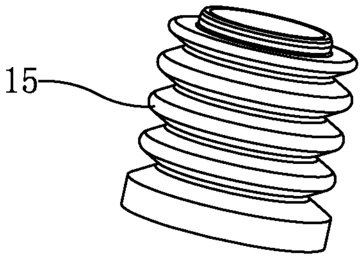
FIG. 25 is a plastic spring in the third embodiment of the present invention.
Figure 26:
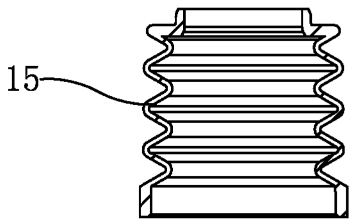
FIG. 26 is a schematic cross-sectional view of the structure of FIG. 25.
Figure 27:
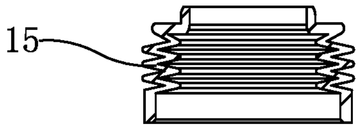
FIG. 27 is a schematic cross-sectional view of the structure of FIG. 26 when pressed.
Figure 28:
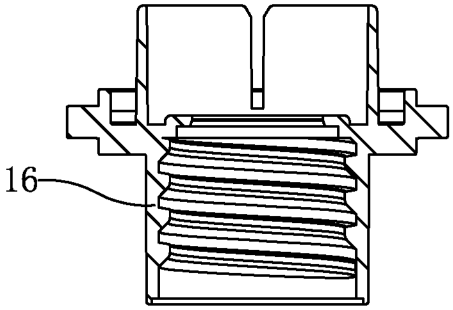
FIG. 28 is a cross-sectional structural diagram of the inner ring in the third embodiment of the present invention.
Figure 29:
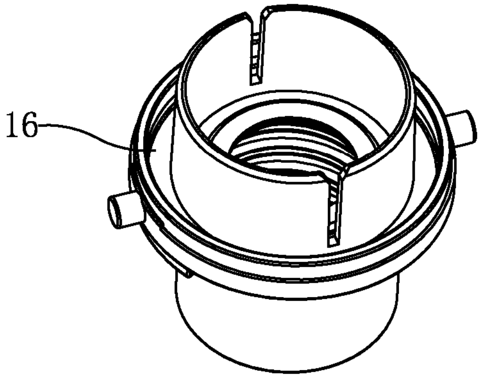
FIG. 29 is a schematic diagram of the three-dimensional structure of FIG. 28.

The spring structure of the vacuum pump is modified in the following manner: the inner hole of the spring is nested outwardly of the vertical groove of the first valve stem cylinder, one end of the spring is secured in the upper stepped groove of the first valve steam and the other end is secured in the lower stepped groove of the first inner plug. Thereby, the spring does not come into contact with the liquid whenever in use and avoid having chemical reaction with liquid, its appearance and function will not be affected, free from liquid contamination or deterioration. The sealing structure of the piston equipped with the first valve stem is modified in the following manner: the inner ring of the piston on the inner walls in the bottom end of the first valve stem is sealed to the ring rim in the piston of the piston sealing ribs, so that a sealing structure following the liquid direction would be formed. For trial spray, as shown in FIG. 4, the sealing at Point A can be hardly affected by the hydraulic pressure during the liquid trial spray, which can greatly improve the liquid leakage in trial spray due to rapid trial spray or under high viscosity and high hydraulic pressure. With respect to the original design of the spring pump core that is outwardly placed, the sealing point is counterflow liquid sealing, which may easily leak due to liquid impact. Effective sealing is impossible when rapidly pressing or under high viscosity and high hydraulic pressure.

The trial spraying process of edge skewing and pressing of the vacuum pump is modified in the following way: the vertical groove of the first valve stem cylinder passes through the inner hole of the upper plug of the first valve stem, to the extent that the first valve stem moves in a vertical center manner with the first inner plug during the vertical movement. And the upper ring in the upper part of the first valve stem is placed in the inner hole of the upper plug of the first inner plug, to the further extent that the centers of the first valve stem and the first inner plug would form a double-layer control center structure; in this way, the skewing of the first valve stem that leads to the skewing of the first head cap after the assembly process can be effectively improved, and defects such as liquid leakage or no suction power during the trial spraying process of edge skewing and pressing would be greatly improved. As shown in FIG. 2, when the vacuum pump presses the first head cap at its edge in actual application, the first head cap becomes skewed due to uneven distribution of force, leading to the skewing of the first valve steam. As the stroke further presses, the upper ring in the upper part of the first valve stem gradually increases the straight-out fitting to the inner walls of the upper plug of the first inner plug, which can effectively control the skewing degree of the first valve steam, make sure that the parts adjoined to the first valve steam is immune to the skewing, and greatly improve the stability and extensive use of the product. In the original design of externally provided spring pump core of similar types, the first valve stem is only fit to the inner hole of the first inner plug. Consequently, during the trial spraying process of edge pressing the first head cap, the first valve steam is likely to cause the skewing of the valve pin and the piston, causes many functional abnormalities, poor stability and narrow suitability of the product.

The sealing fit of the elastic sleeve and the pump body of the vacuum pump is modified in the following way: the elastic sleeve is placed in the pump body, the arc convex surface of the center piece of the spring is sealed to the arc concave surface of the center conical hole of the pump body, the cartridge rim of the elastic sleeve is snapped-fit to the stepped ring diameter ribs above the center conical hole of the pump body; when pressing and returning, the adjoining ribs through the elastic sleeve are slightly deformed, so that the elastic sleeve can open for liquid entry, or close for sealing. In the original design of externally provided spring pump cores of similar types available on the market, when the elastic sleeve is equipped with a piston structure, the elastic sleeve and pump body are constructed in plane-plane sealing structure, which is not easy to seal and there is less sealing faces, uneven or slanted plane may disable the sealing performance. The arc convex-concave sealing structure, modified from the elastic sleeve structure of the vacuum pump, significantly increases the sealing fit surface than the plane structure, and the arc is convex-concave fit. If there is a slight skewing, it will be automatically guided to return with the arc skewed surface, which would greatly improve stability and sealing performance.

Referring to the second embodiment as shown in FIGS. 7-FIG. 18, the pump core assembly of the vacuum pump is snapped-fit to the center hole of the large ring, the second valve stem 12 of the pump core assembly extends out of the large ring and is adjoined to the first head cap 1, the inlet hole at one side of the pump body of the pump core assembly is provided with a suction tube. The specific structure is described as follows: the tip of the second valve stem is provided with an outwardly flipped groove that curves downwardly, the outer diameter of the stem part of the second valve stem is disposed with intake grooves that are uniformly distributed, one end of the first plastic spring 11 is set against the outwardly flipped groove of the second valve stem, the other end of the first plastic spring is set against the outer ring edge plane of the second inner plug 13 and the end face of the center hole of the large ring, one end of the first plastic spring is provided with an upper sleeve opening, one end of the first plastic spring is provided with a lower sleeve opening, a "W-shaped" cylinder is disposed in an area between the upper sleeve opening and the lower sleeve opening of the first plastic spring, the upper sleeve opening, the lower sleeve opening and the "W-shaped" cylinder of the first plastic spring are formed as one-piece, the first plastic spring is located in the outer diameter of the second valve stem, and the first plastic spring is joined to the pump core assembly.

The said pump body of the said pump core assembly is snapped-fit and secured to the center hole of the large ring through the second inner plug. While the inner concave ring rib of the pump intake of the pump body is unevenly snapped-fit to the outer convex ring rib of the second inner plug, the raised outer ring edge of the outer diameter of the second inner plug is fit to the pump intake of the pump body, the nailhead at one end of the valve pin in the pump body is snapped-fit to the inner rib hole of the second valve stem, a piston is disposed in the outer diameter of the valve pin at the snap-fit point, a liquid distributing channel is disposed on the inner walls of the inner rib hole of the second valve stem, the second valve stem is nested to the second inner plug, the outer diameter of the piston is slipped-fit and sealed against the inner walls of the pump body, a bottom slotted hole is disposed in the bottom part of the second valve pin that nested into the valve pin, the outwardly flipped rim of the piston is slipped-fit and sealed against the inner walls of the bottom slotted hole of the second valve stem, the bottom slotted hole of the second valve stem appears like an arc bottle rim, which means that the bottom slotted hole in the liquid distributing channel of the second valve stem is a semicircular hole, the bottom slotted hole underneath the semicircular hole is a cylindrical hole, and an elastic sleeve is disposed at the inlet hole in the pump body. The said ring rim in the bottom part of the first head cap is located in an area above the ring groove of the outer diameter of the center hole of the large ring, a ring catch groove is disposed in the outer diameter of the center hole underneath the large ring, a buffer groove is disposed in the large ring of the outer diameter of the ring groove, convex ribs are provided in the large ring underneath the buffer groove, and the end of ribs flushes with the outer ring rim of the buffer groove. A spacer plug is disposed in an area between the outer diameter of the pump body underneath the center hole of the said large ring and the ring catch groove, the height of the ring rim of the spacer plug is below that of the ring catch groove, and a spacer ring is disposed in an area between the outer diameter of the pump body and the inner diameter of the spacer plug. An open groove is disposed on one side of the inner diameter of the ring rim of the ring groove of the large ring. The large ring of the said vacuum pump is used in the emulsion bottle product of inner and outer bottles; referring to FIGS. 17 and 18, the second inner plug is an outwardly flipped inner plug, the outer diameter of the pump intake of the pump body is snapped-fit and secured on the lower inner groove of the outwardly flipped inner plug, and the outer diameter of the lower inner groove of the outwardly flipped inner plug is snapped-fit and secured on the center hole of the large ring.

The said vacuum pump is an emulsion nozzle constructed in a push-type plastic spring structure, the elastic sleeve, the pump body, the valve pin, the piston, the second inner plug, the second valve stem, and the first plastic spring make up the pump core assembly. The main innovations lie in the modification of the pump core structure in emulsion nozzle and the technological R&D and application of hi-tech materials in vacuum pump and emulsion pump, especially the outer guard spring modified to the first plastic spring, so that it can be generally recycled and processed without disassembly. Its main features include: 1. The first plastic spring is designed in a new manner and appears like a multi-section, tower-like, corrugated cylinder structure, with thru-hole designed in the middle and ultrathin walls, and “W-shaped” outer ring. The convex-concave “W-shaped” structure is more consistent with elastic mechanics and further facilitates the production deformation to create a good elastic effect. The hand feel of pressing is very soft and smooth, compared to rigid and abrupt feel of traditional wire spring. 2. The vacuum pump is one-piece plastic structure made of recycling plastic, eco-friendly and healthy. The nozzle can be directly recycled without disassembly, eco-friendly, low-carbon, economical, efficient and convenient.

It is produced and assembled in the following manner: the middle thru-hole of the first plastic spring is nested into the cylindrical section of the second valve stem, the end face of the upper sleeve of the first plastic spring is disposed on the plane of outwardly flipped groove of the second valve stem, the other end face at the lower sleeve of the first plastic spring is disposed on the plane of outer ring edge of the second inner plug, and the outer diameter of the lower sleeve is nested in the inner diameter of the center hole of the large ring. Thereby, the first plastic spring can be truly assembled in the pump core assembly and becomes one-piece pump core assembly. When the first head cap is pressed, the second valve stem is driven to move down, so that the corrugated cylinder of the first plastic spring is compressed and deformed; once released, the corrugated cylinder of the first plastic spring rebounds and returns, then drives the second valve stem, the first head cap, the piston, and the valve pin to move upward, so that the pressing and returning features of the pump core assembly would be achieved. The advantage of this vacuum pump is that it is convenient for production, and one-piece plastic pump core assembly is a standalone assembly as general-purpose part. When equipped with a large ring, the first head cap can be readily assembled to product, coupled with different large rings and first head caps if needed, then made into diverse combinations, so that the consumers’ needs would be satisfied. Most of the nozzles constructed in first plastic spring structure available on the market are one-piece design, which cannot realize one-piece plastic structure of a single pump core assembly. Thus, a fixed large ring and a fixed first head cap should be equipped to make a product with one-piece plastic structure nozzle. In this sense, such available nozzles are single-type and rigid.

Referring to the third embodiment as shown in FIG. 19-FIG. 29, the rotating ring 18 of the said outer guard 17 is provided with a spiral slotted hole, column pins are symmetrically disposed on the outer diameter of the middle ring of the inner ring 16, the column pins of the inner ring are inserted into the guard locating slot of the inner walls of the outer guard, an inner ring slot is disposed in the middle above the middle ring of the inner ring, open ring locating slots are symmetrically disposed at the ring ribs on both sides of the inner ring slot of the inner ring, the pump core assembly is snapped-fit and secured to the center hole of the inner ring, a washer is disposed on the outer ring of the pump core assembly beneath the area where it is snapped-fit and secured, the first valve stem of the valve core assembly extends out of the inner ring and is joined to the second head cap 14, a spring is disposed on the outer ring of the first valve stem of the valve core assembly. The said spring is the second plastic spring 15 with an outer sleeve opening disposed on one end and an inner sleeve opening disposed on the other end, a “W-shaped” cylinder is arranged between the outer sleeve opening and the inner sleeve opening of the second d plastic spring. The outer sleeve opening, the inner sleeve opening and the “W-shaped” cylinder are formed in one-piece on the second plastic spring. Both ends of the second plastic spring are set against the second head cap and the inner ring. In other words, the outer diameter of the outer sleeve opening of the second plastic spring is nested in the rib groove in the bottom part inside the second head cap, the ring rim of the inner sleeve opening of the second plastic spring is set against the ring groove in the bottom part of the inner ring groove of the inner ring, and the second plastic spring is disposed inwardly of the inner ring groove of the inner ring. The rib groove of the said second head cap is disposed on the rib plates of the bottom inside the second head cap. The rib plates are arranged symmetrically in a cross shape, the inner walls of the rib grooves on both sides of the outlet hole are symmetrically provided with guide ribs, the guide ribs of the second head cap are inserted into the ring locating slot of the inner ring. The ring rim of the outer diameter in the bottom part of the second head cap is disposed above the guide groove of the inner ring, the guide slot is disposed outwardly of the inner ring groove of the inner ring, and the inner groove notch of the inner ring is located inwardly of the ring rim of the outer diameter in the bottom part of the second head cap.

The said pump body of the said pump core assembly is snapped-fit and secured to the center hole of the large ring through the second inner plug. While the inner concave ring rib of the pump intake of the pump body is unevenly snapped-fit to the outer convex ring rib of the second inner plug, the raised outer ring edge of the outer diameter of the second inner plug is fit to the pump intake of the pump body, the nailhead at one end of the valve pin in the pump body is snapped-fit to the inner rib hole of the second valve stem, a piston is disposed in the outer diameter of the valve pin at the snap-fit point, a liquid distributing channel is disposed on the inner walls of the inner rib hole of the second valve stem, the second valve stem is nested to the second inner plug, the outer diameter of the piston is slipped-fit and sealed against the inner walls of the pump body, a bottom slotted hole is disposed in the bottom part of the second valve pin that nested into the valve pin, the outwardly flipped rim of the piston is slipped-fit and sealed against the inner walls of the bottom slotted hole of the second valve stem, the bottom slotted hole of the second valve stem appears like an arc bottle rim, which means that the bottom slotted hole in the liquid distributing channel of the second valve stem is a semicircular hole, the bottom slotted hole underneath the semicircular hole is a cylindrical hole, and an elastic sleeve is disposed at the inlet hole in the pump body; The top of the locking fitting is provided with a large tight ring, the small air tight ring of the first valve stem is nested into the inner diameter of the air tight ring of the lock fitting. A small ring groove is disposed in the middle underneath the middle ring of the said inner ring, an inner thread is provided in the small ring groove, the ring rim of the small ring groove is disposed at a height lower than the ring rim of the rotating ring, the hole on one side of the elastic sleeve of the pump body is disposed in the ring rim of the rotating ring, a fastening ring is disposed in the inner diameter of the ring rim of the rotating ring, the diameter of the fastening ring of the rotating ring is smaller than the inner diameter of the rotating ring above it, a limiting step ring is disposed in the fastening ring of the rotating ring and its one end is provided with convex ribs that are symmetrically arranged. The outer diameter of the inner ring and the outer diameter of the rotating ring are formed in a cylindrical shape as one-piece, a raised nozzle is disposed on one side of the second head cap and the nozzle is recessed in the nozzle groove disposed on one side of the tip of the outer guard. According to the above structure features, the said spring may be optionally disposed in an area between the small tight ring of the first valve stem and the large tight ring of the lock fitting.

The said vacuum pump is a vacuum nozzle constructed in a push-type plastic spring structure, the elastic sleeve, the pump body, the valve pin, the piston, the second inner plug, the second valve stem, and the first plastic spring make up the pump core assembly. Its main structure features include: 1. The second plastic spring is designed in a new manner and appears like a multi-section, tower-like, corrugated cylinder structure, with thru-hole designed in the middle and ultrathin walls, and "W-shaped" outer ring. The convex-concave "W-shaped" structure is more consistent with elastic mechanics and further facilitates the production deformation to create a good elastic effect. The hand feel of pressing is very soft and smooth, compared to rigid and abrupt feel of traditional wire spring. 2. The vacuum pump is one-piece plastic structure, the middle thru-hole of the second plastic spring is nested in the pump core assembly, the end face of the outer sleeve of the second plastic spring is disposed on the plane at the rib grooves on four rib columns of the second head cap, the other end face at the inner sleeve of the second plastic spring is disposed on the plane at the ring groove outwardly of the center hole of the inner ring. When the second head cap is pressed, the second valve stem is driven to move down, so that the corrugated cylinder of the first plastic spring is compressed and deformed; once released, the corrugated cylinder of the second plastic spring rebounds and returns, then drives the second valve stem, the first head cap, the piston, and the valve pin to move upward, so that the pressing and returning features of the pump core assembly would be achieved.

The invention claimed is:

1. A vacuum pump comprising:

a pump body that includes an elastic sleeve;

a valve stem;

a valve pin that is surrounded by the valve stem with an end of the valve pin snap fitted to the valve stem;

a piston that surrounds the valve pin and that is located inside of the pump body and sealed against the pump body;

a plug with an inner body that is located within the pump body, an outer body that is located outside the pump body with the valve stem located inside of the plug, and a stepped groove that is located between the inner body and the outer body and has a diameter larger than the inner body and the outer body;

a ring that surrounds the pump body and the plug;

a head cap that surrounds the valve stem and that is configured to move within a cavity of the ring; and a spring disposed between the valve stem and the stepped groove of the plug at a position radially outward of the valve stem, wherein:

an inner surface the pump body is snapped-fit and sealed against an outer surface of the inner body of plug, an inner diameter of the outer body of the plug is larger than an inner diameter of the inner body of the plug, the valve stem includes an inner cavity from which the piston is located and an upper cavity, the upper cavity is a groove that is open toward the pump body, an upper end of the spring is placed in the upper cavity and a lower end of the spring is placed against the stepped groove and the ring, and when the head cap is moved within the cavity of the ring, the head cap is configured to move the valve pin within the pump body via the valve stem.

* * * * *